(12) United States Patent
Tannenbaum

(10) Patent No.: US 7,254,548 B1
(45) Date of Patent: Aug. 7, 2007

(54) SYSTEM AND METHOD FOR THE ADMINISTRATION OF FINANCIAL ACCOUNTS USING PROFILES

(75) Inventor: Mary C. Tannenbaum, Dallas, TX (US)

(73) Assignee: Union Beach, L.P., Dallas, TX (US)

( * ) Notice: Subject to any disclaimer, the term of this patent is extended or adjusted under 35 U.S.C. 154(b) by 704 days.

(21) Appl. No.: 10/192,426

(22) Filed: Jul. 10, 2002

(51) Int. Cl.
G06Q 20/00 (2006.01)

(52) U.S. Cl. ............................ 705/18; 705/16; 705/17; 705/44; 235/380; 235/382

(58) Field of Classification Search ................. 705/16, 705/17, 18, 26, 30, 32, 39, 44; 235/380, 235/382
See application file for complete search history.

(56) References Cited

U.S. PATENT DOCUMENTS

| | | | | |
|---|---|---|---|---|
| 5,708,422 A * | 1/1998 | Blonder et al. | ............ | 340/5.41 |
| 5,845,260 A * | 12/1998 | Nakano et al. | ................ | 705/26 |
| 5,857,079 A | 1/1999 | Claus et al. | | |
| 5,914,472 A * | 6/1999 | Foladare et al. | ............ | 235/380 |
| 5,953,710 A * | 9/1999 | Fleming | ..................... | 705/38 |
| 5,991,750 A * | 11/1999 | Watson | ........................ | 705/44 |
| 6,006,205 A | 12/1999 | Loeb et al. | | |
| 6,173,269 B1 * | 1/2001 | Solokl et al. | .................. | 705/35 |
| 6,349,290 B1 | 2/2002 | Horowitz et al. | | |
| 6,353,811 B1 | 3/2002 | Weissman | | |
| 6,796,497 B2 * | 9/2004 | Benkert et al. | ............. | 235/380 |
| 2001/0034720 A1 * | 10/2001 | Armes | ......................... | 705/65 |
| 2002/0062279 A1 | 5/2002 | Behrenbrinker et al. | | |
| 2002/0073416 A1 * | 6/2002 | Ramsey Catan | ................ | 725/6 |
| 2004/0039694 A1 * | 2/2004 | Dunn et al. | .................... | 705/39 |

FOREIGN PATENT DOCUMENTS

WO WO 01/73575 A1 * 10/2001

* cited by examiner

Primary Examiner—Florian R. Zeender
Assistant Examiner—Luna Champagne
(74) Attorney, Agent, or Firm—Fulbright & Jaworski LLP

(57) ABSTRACT

A credit facility for controlling financial transactions is arranged with the ability of users to establish self-imposed limits on a category by category basis. The processing system provides messages and other information to the user, both on-demand and at the point of sale, based upon the category of the transaction and the limit set for that category. In one embodiment, both the user and, if desired, third parties, can obtain or be notified, of account balances on a category by category basis. Also, the main user can assign category limits, or prohibitions, on subusers of the same account. In one embodiment, information pertaining to a specific transaction is communicated to a third party.

18 Claims, 6 Drawing Sheets

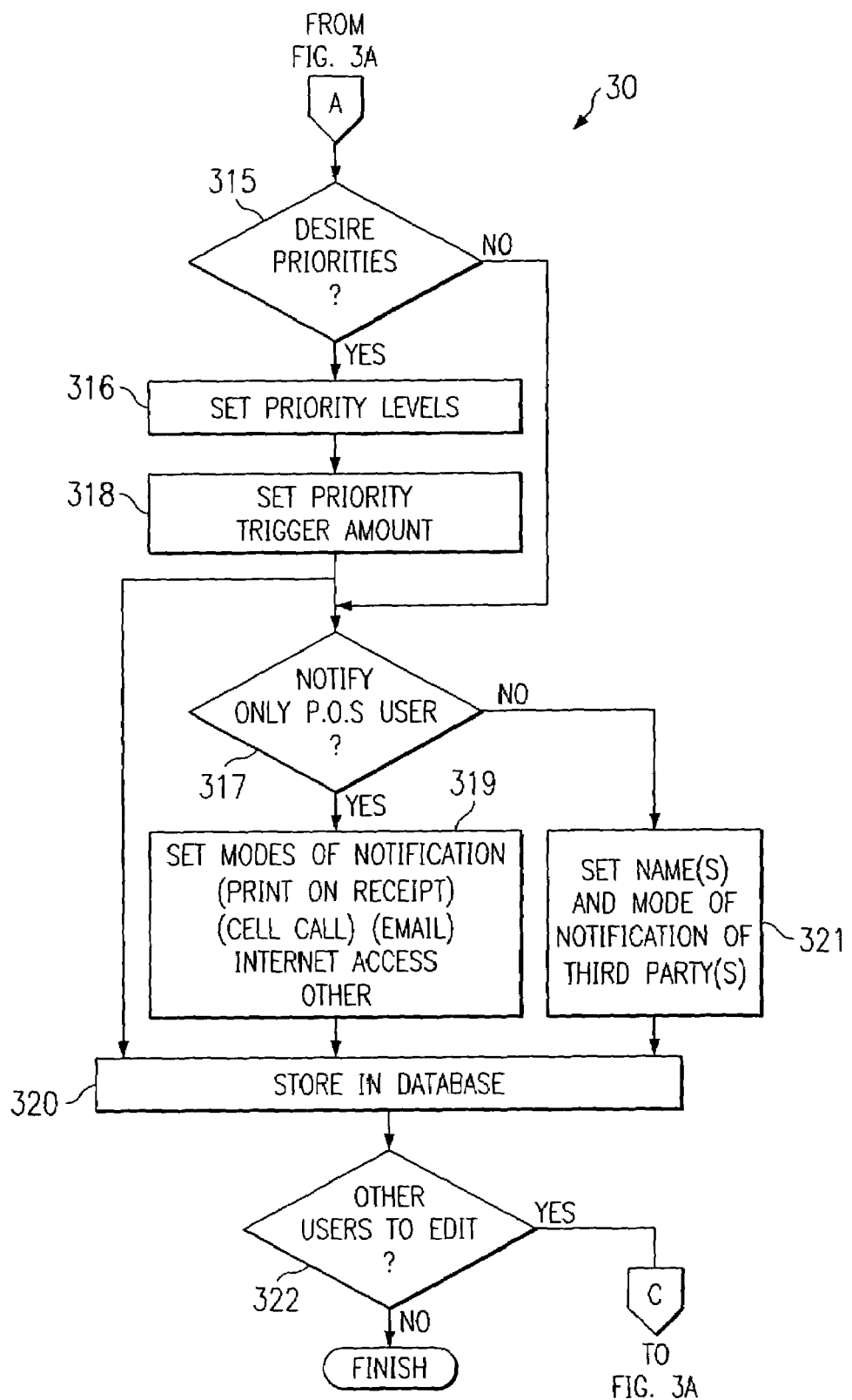

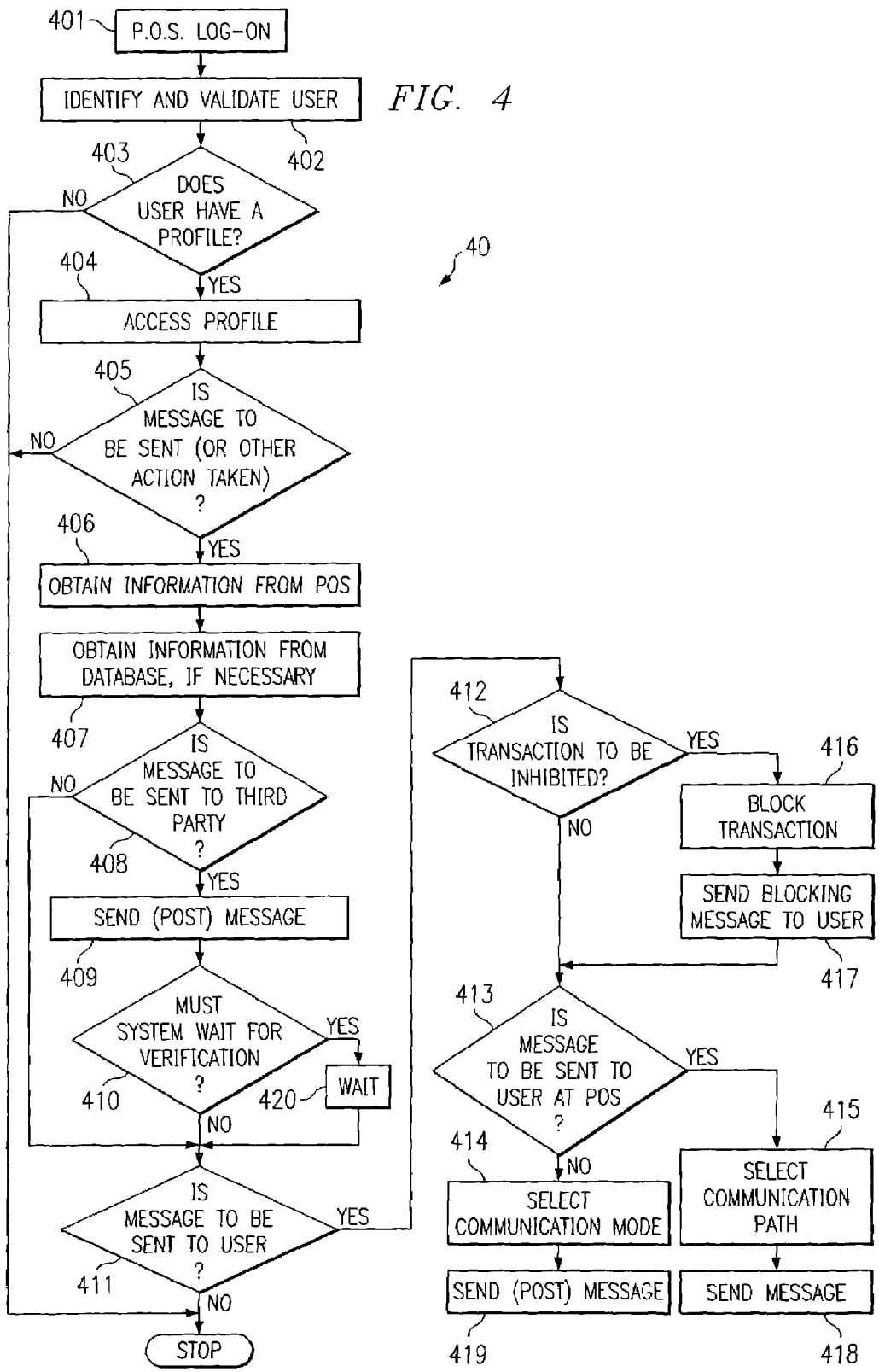

FIG. 5

| CATEGORY | CODE | AMOUNT | PRIORITY | ACCOUNTING PERIOD | ADJUSTMENT AMOUNT | ADJUST | USER (PIN) |
|---|---|---|---|---|---|---|---|
| FOOD | 01 | $200 | 1 | WEEKLY | $100 | JULY-AUG | ALL |
| SNACKS | 02 | $50 | 2 | MONTH | $50 | JULY-AUG | ALL |
| CLOTHING | 03 | $150 | 2 | MONTH | $500 | AUG | ALL |
| RESTAURANTS | 04 | $200 | 3 | MONTH | $300 | JULY | A |
| BOAT | 05 | $1000 | 3 | SEMI-ANNUAL | - | - | B |
| TRAVEL | 06 | $4000 | 2 | SEMI-ANNUAL | - | - | A, B |
| GIFTS | 09 | $50 | 2 | MONTH | $2000 | DEC | A, B |
| ENTERTAIN | 10 | $400 | 3 | MONTH | - | - | A |
| OVERALL | 00 | $2000 | - | ANYTIME | $2000 | DEC | |
| ALCOHOL | 11 | | BLOCKED | | | | NONE |

FIG. 6

| STORE | ITEM | NATURAL CATEGORY | PROFILE CATEGORY |
|---|---|---|---|
| SUPERMARKET | MEAT | FOOD | FOOD |
| SUPERMARKET | POTATOES | FOOD | FOOD |
| SUPERMARKET | VEGETABLE | FOOD | FOOD |
| SUPERMARKET | COOKIES | FOOD | SNACKS |
| SUPERMARKET | ICE CREAM | FOOD | SNACKS |
| SPORT STORE | FISHING GEAR | SPORT | BOAT |
| DEPARTMENT STORE | SHIRTS | CLOTHING | CLOTHING |
| DEPARTMENT STORE | SHOES | CLOTHING | CLOTHING |
| SPORT STORE | SHOES | CLOTHING | BOAT |
| CABLE COMPANY | CABLE TV | ENTERTAIN | HOME |

| ITEM | STORE | DESCRIPTION | AMOUNT | CATEGORY | PROFILE BUDGET | ACTUAL PERIOD | ACTUAL BUDGET | YEAR TO DATE | CHANGE |
|---|---|---|---|---|---|---|---|---|---|
| X1035 | VIDEO | MOVIE RENTALS | $20 | ENTERTAIN | $100 | MONTH | $145 | OVER | HOME |
| 3801 | THEATER | MOVIE | $30 | ENTERTAIN | $100 | MONTH | $145 | OVER | — |
| — | CABLE | CABLE | $45 | ENTERTAIN | $100 | MONTH | $145 | OVER | HOME |
| 1202 | BOOK | NOVEL | $10 | ENTERTAIN | $100 | MONTH | $145 | OVER | |
| 1209 | BOOK | TRAVEL BOOK | $20 | ENTERTAIN | $100 | MONTH | $145 | OVER | TRAVEL |
| — | BIG T | MEN'S SHOES | $80 | CLOTHING | $100 | MONTH | $230 | UNDER | BOAT |
| — | BIG T | CHILDREN'S SHIRTS | $50 | CLOTHING | $100 | MONTH | $230 | UNDER | — |
| 3351 | DEPARTMENT STORE | MEN'S SHOES | $100 | CLOTHING | $100 | MONTH | $230 | UNDER | — |

SYSTEM AND METHOD FOR THE ADMINISTRATION OF FINANCIAL ACCOUNTS USING PROFILES

FIELD OF THE INVENTION

This invention relates to network administration of point of sale financing and more particularly to a system and method for providing the consumer user with account information in a timely manner using profiles.

BACKGROUND OF THE INVENTION

The popularity of credit cards, debit cards, and other facilities for financing transactions for the consuming public at the point of sale is now without question. It is easy, and all too prevalent, that along with such popularity and ease of use of most point of sale credit facilities, comes financial difficulty for many people.

It is difficult, even for the most disciplined person, to resist the temptation of purchasing a product spontaneously. This impulse buying is often encouraged by merchants and, when done well, is highly effective.

Today, most credit facilities, such as credit cards, have ultimate spending limits, such that when the limit is exceeded (or the most recent invoice not paid promptly) the consumer user is denied further access to credit. Usually, by this time, the consumer is in financial distress.

Many credit facilities today allow consumer users to obtain current balances, as well as recent purchase information, by telephone or Internet, or other on-line access. This historical data does not adequately address the problem, as it does not help the consumer in making purchasing decisions at the time a purchase decision is being contemplated. Also, many credit facilities give annual print-out summaries of purchases by category. While such reports are nice to have at tax season, or for next year's planning, they are a backward-looking view and do not serve to help the consumer on a day-to-day basis. People on fixed incomes, low incomes and people with debt "problems," should be on rigid budgets and may require current financial information in a more timely manner. People striving simply to "watch" their spending also require current information, if they are to make intelligent buying decisions.

Another problem exists today when some users have the use of a card issued to another person. For example, in an employer/employee situation often an employee is given use of a credit card for the purchase of goods or services which are business related. Unfortunately, such credit facilities are sometimes misused, or the balances go too high, and by the time the employer learns of the problem it may be too late to remedy the situation.

SUMMARY OF THE INVENTION

The present invention is directed to a system and method which allows consumer users to establish self-imposed limits on the user's spending (borrowing) such that when the limit is reached the consuming user is notified. This notification can be before, during or after the point of sale transaction, and can be delivered, if desired, by the account clearing network and printed on the user's purchase receipt. The notification message can be delivered via a phone call, email or over an Internet connection to the user. The notification can be to one or more designated third parties, such as a parent, or card owner, or a debt counselor.

In a preferred embodiment, the user will pre-establish self-imposed spending limits (guidelines) on a category by category basis, and each category can have, if desired, a different accounting period. For example, the food category can have a monthly (or weekly) limit, while the hobby category can have, for example, an annual or semi-annual limit. Since these limits are self-imposed, they do not impact the user's ability to complete any transaction, but rather they serve to provide the user meaningful information at a time when that information is most useful.

In another preferred embodiment, the user may access his/her account, other than at the point of sale, to see (or hear) a running total of category balances, based on accounting periods, as well as comparisons against the user imposed pre-established category by category budget.

In another preferred embodiment, the user can establish the limits, and can change the limits when desired, by telephone, email, Internet or the like. Also the limits need not be constant from accounting period to accounting period. Thus, if a person's ability to repay the charged (borrowed) amount fluctuates during the year, the user may pre-establish that the limits will automatically change during those periods. Also, the user might decide that if his/her total outstanding balance reaches a certain amount, certain budgeted categories then will be reduced until the total unpaid amount recedes below the "critical" level. In this regard different categories can be given different priorities.

For example, assume a user has a total line of credit of, say, $5,000. Also assume that the user has established that his/her food budget is to be $200 per week (with the highest priority set), and that the boat budget is $1,000 per year (with the lowest priority set). Also let us assume that the user has set a self-imposed arbitrary cap on his/her outstanding credit card balance of, $2,000, let us assume also that the current outstanding balance has exceeded the self-imposed $2000 limit, but has not reached the $5,000 card limit.

Now let us assume that the user desires to buy a new $100 fishing rod for his boat and this will be the first "boat" purchase this year. The user can access his account in any number of ways, for example, by voice, or by Internet or at the point of sale. When the user accesses the account, since the self-imposed outstanding balance cap of $2,000 has been exceeded, the user will be informed that the available budget for the fishing rod is zero, even though the available budget amount is $1,000 and even though the line of credit still allows for $3000 worth of spending. Note, that had the user inquired about a food category he/she would have been told the actual amount available (or the actual amount used, if desired) in the "food" category.

In a still further embodiment, the user may establish sub-users on his/her account and may authorize each user to use the account only with respect to certain categories, or category amounts, or only up to a certain credit limit, or only for a certain period of time, or a combination of the above.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DESCRIPTION OF THE DRAWINGS

For a more complete understanding of the present invention, reference is now made to the following descriptions taken in conjunction with the accompanying drawing, in which:

FIGS. 3A and 3B show one embodiment of the operation of my invention where the user obtains information from and/or edits his/her profile;

FIG. 4 shows one embodiment of my invention where the processing system, in response to a request, provides a message and/or blocks the transaction dependant, in part, upon the information contained in the user's profile;

FIGS. 5 and 6 show embodiments of profile data bases on a category by category basis; and FIG. 7 shows one embodiment of a user account organized by category.

DETAILED DESCRIPTION OF THE INVENTION

Figure 1:
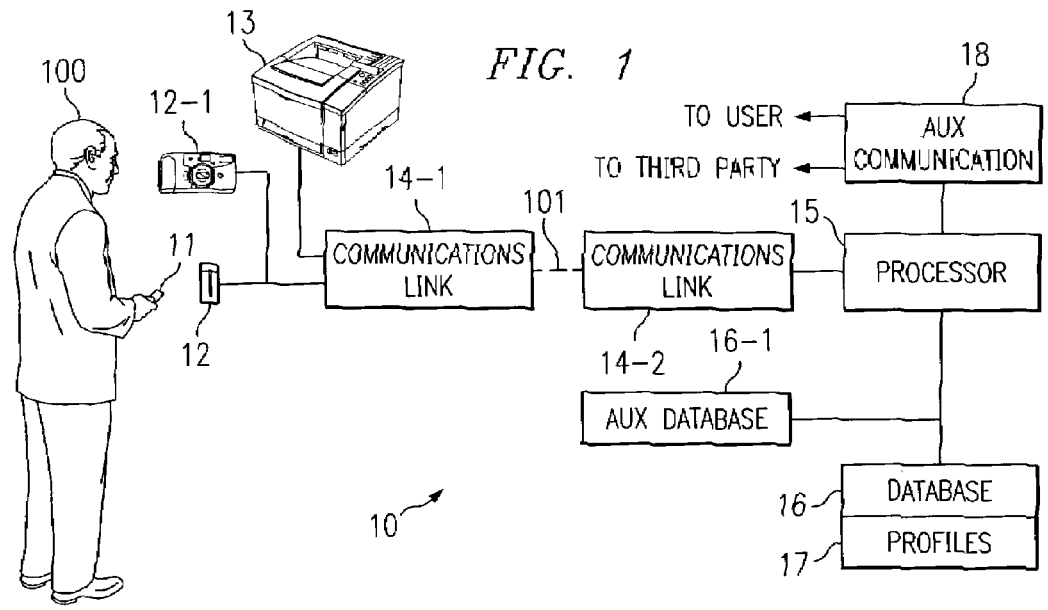
FIG. 1 shows a block diagram of one embodiment of my invention where the credit card user is making a purchase at a point of sale located at a merchant's premises.

Turning now to FIG. 1, there is shown System 10, which is one embodiment showing user 100 with credit card 11, getting ready to insert the card into card reader 12 to complete a sales transaction at a point of sale. The information from card reader 12 is communicated via communications links 14.1 and 14.2 and network 101 to central processor 15. Processor 15, in conjunction with database 16 and profiles 17, then categorizes the various purchases being made and stores those purchase amounts and categories in database 16, according to profiles of user 17, as stored, for example, in profile data base 17.

As will be discussed, these profiles can include not only the budget amounts for each category, but what types of items would fit into the different categories. Based upon the profiles, processor 15 then can communicate in one or more of several way, such as, for example, back over communications links 14-1, 14-1 to user 100 or over alternate communication paths via auxiliary communication 18. This communication can be, for example, via printer 13, or it can be via auxiliary communication path 18. Auxiliary communication 18 can be, for example, to the user via cell phone, pager, or other device. At the same time, if desired, third parties, such as parents, employers, debt counselors and others, could also be notified. This communication can, if desired, occur for all purchases, or for certain of the purchases by category or by amount.

The system can be designed, if desired, such that if the amounts in a category (or if the total outstanding balance at that time) were to exceed a certain amount, user 100, or a third party as identified in the user's profile, would be required to give specific approval for a particular purchase. This system could be extended so that third parties (such as parents) can allow a child to use a credit card, but certain purchases over a certain amount, or all purchases, or purchases in certain categories, will require approval from the parent (or other third party), who would not actually be present at the point of sale.

For example, a parent could allow a child to have a credit card for the purpose of buying clothes. The child then selects his or her purchases at a location and runs card 11 through the card reader at the point of sale. The system, via profile 17, database 16 and processor 15, then recognizes that this is a card which is a sub-account card of a main account, or an account that is otherwise special to this person. Processor 15 then enables a communication to the third person identified by profile 17 via auxiliary communication 18. This communication could be, for example, cellular, landline, Internet, pager, PDA, or the like. The purchase can only be completed, if the third person responds in a positive manner (perhaps by pushing a button or speaking an acceptance word as set out in the user's profile). Processor 15, perhaps working in conjunction with other network processors, controls the acceptance back to the point of sale.

In some situations, it could be appropriate for the item that is being purchased to have a picture, available either in an auxiliary database 16-1, or transmitted from the point of sale at the time of purchase, transmitted to a third person, either for approval or simply for information purposes. This would be helpful, for example, when a husband is buying a suit and wants his wife to see the suit before the purchase is consummated. A picture of the suit could be captured by camera 12-1, communicated over the communication link to processor 15, and then through auxiliary communication 18 to a designated third party at a cell phone, computer, pager, PDA, or the like.

In some situations, the purchaser may desire additional information, such as warranties, specifications, pictures, assembly instructions, to be sent to a specific location (such as the point of sale, or to his/her home), or the purchaser may wish to register his/her purchase with the seller, or even apply for a rebate, all at the time or purchase. Processor 15, working in conjunction with database 16 and profiles 17 then could send the purchaser's address and other information to the seller. The seller's information obtained from transmitted POS information, or from data contained at the central location, such as from auxiliary database 16-1, would be combined with the user's (purchaser's) information as obtained from database 16, and sent to the seller. Since the user specific database contains information pertaining to the user's prior purchases it could be used, for example to aid the purchaser in making new purchases, perhaps by providing compatibility information to the user, either at the POS or on demand. This compatibility information could be within system 10, but would likely reside with each specific seller and could be supplied to the user at the POS (or on demand) in response to the above-discussed purchase registration.

Note that auxiliary database 16-1 can hold any type of information that is desired to be communicated to either user 100 or to third parties. This information could be sound, video, or any type of information, and can be stored in compressed format in the well-known manner. Also the information sent to a third party could be, for example, pictures, video, color, audio or any combination thereof. In addition, the information could be partially located in the database, such as database 16-1 and available based upon some information, perhaps a bar code or other information sent from card reader 12 or from camera 12-1.

In addition, the system could use camera 12-1 to take a live picture of user 100 at the point of sale and to then match that picture against a known picture or other information. This could then be sent to a third party for verification based upon a profile in database 17. Thus, when a main user of a credit card allows other sub-users, which could be employees, children, relatives, temporary workers, to use the sub-account card, each purchase using the sub-account card could trigger, if desired, the taking of a picture of the then user at the POS. This picture, or other information (such as a password) could be transmitted, under control of profile 17, database 16 and processor 15 to the main user, as discussed above, such that the transaction would not be completed until the main user signified acceptance.

This system, for example, could be used to keep an account "open" for the real user for a period of time when a card is reported lost or stolen. In such an event, the profile would be used to provide the system with a special verification procedure unique to the user. This verification could be for example, a password necessary at each purchase, or a biometric sent from the POS for comparison during each transaction.

System 10 could operate such that the main user, as will be discussed, can at any time change his/her profile, thereby adding or changing passwords, and assigning passwords or other control information to the profile. These passwords could be for the main account, or for any sub-account. When the credit card is presented at a POS, system 10 would check the user's profile to see if any such passwords, third party approvals, etc, are required. If so, the salesperson at the point of sale could then follow directions sent to that person via network 101 so as to obtain the proper identification of the user. This would give an added measure of security to credit card users. For example, the profile of a user might specify that call-in purchases (ones where the card is not physically present at the POS location) will need to be verified by a specified password, or verified by a communication placed by the salesperson (or by system 10) to a third person. The user's own created profile will allow for flexibility in this regard.

Note that the profile of the user, including database information if desired, could be stored on the user's card along with, if desired, at least some of the processing. In such a scenario, information from the profile would be sent to a central processing network to provide the services for the user as discussed above. A so called "smart card" would be one method of accomplishing this objective.

Figure 2:
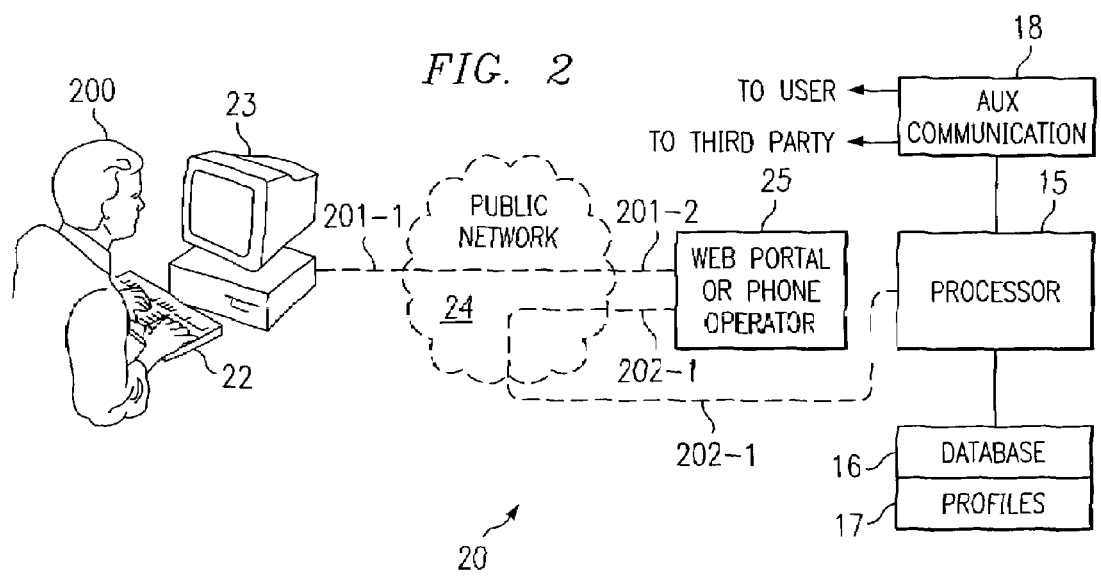
FIG. 2 shows a block diagram of another embodiment of my invention where the credit card user is making a purchase, editing a profile or obtaining account information via an on-line Internet (or telephone) connection.

Turning now to FIG. 2, there is shown System 20 in which user 200 is utilizing keyboard 22 and computer 23 to access his or her account via communication links 201-1 and 210-2 and public network 24 to web portal or phone operator 25. Portal 25 then accesses processor 15 via communication link 202-1. Such accessing of the system by user 200 could be for the purpose of obtaining account information at any time on a category by category basis, or for establishing (as will be discussed) various account categories, balances and sub-users, or user 200 could be using computer 23 (which could be a telephone, pager, PDA, or the like) as a POS device. Note that connection 201-1, as well as the other connections shown, could also be by pager network, cellular network or any other type of network, including for example, wireless, wire line or the cable satellite network typically utilized for broadcast signals into the home for entertainment purposes. Once connected to processor 15, the system operates as discussed above with respect to FIG. 1. In the situation where at least a portion of the processing is on the user's smart card, then the user would insert his/her card at a reader (not shown) associated with computer 23. Of course, if the smart card included wireless technology, such a reader would be unnecessary, both in FIG. 2 as well as in FIG. 1.

Figure 3A:
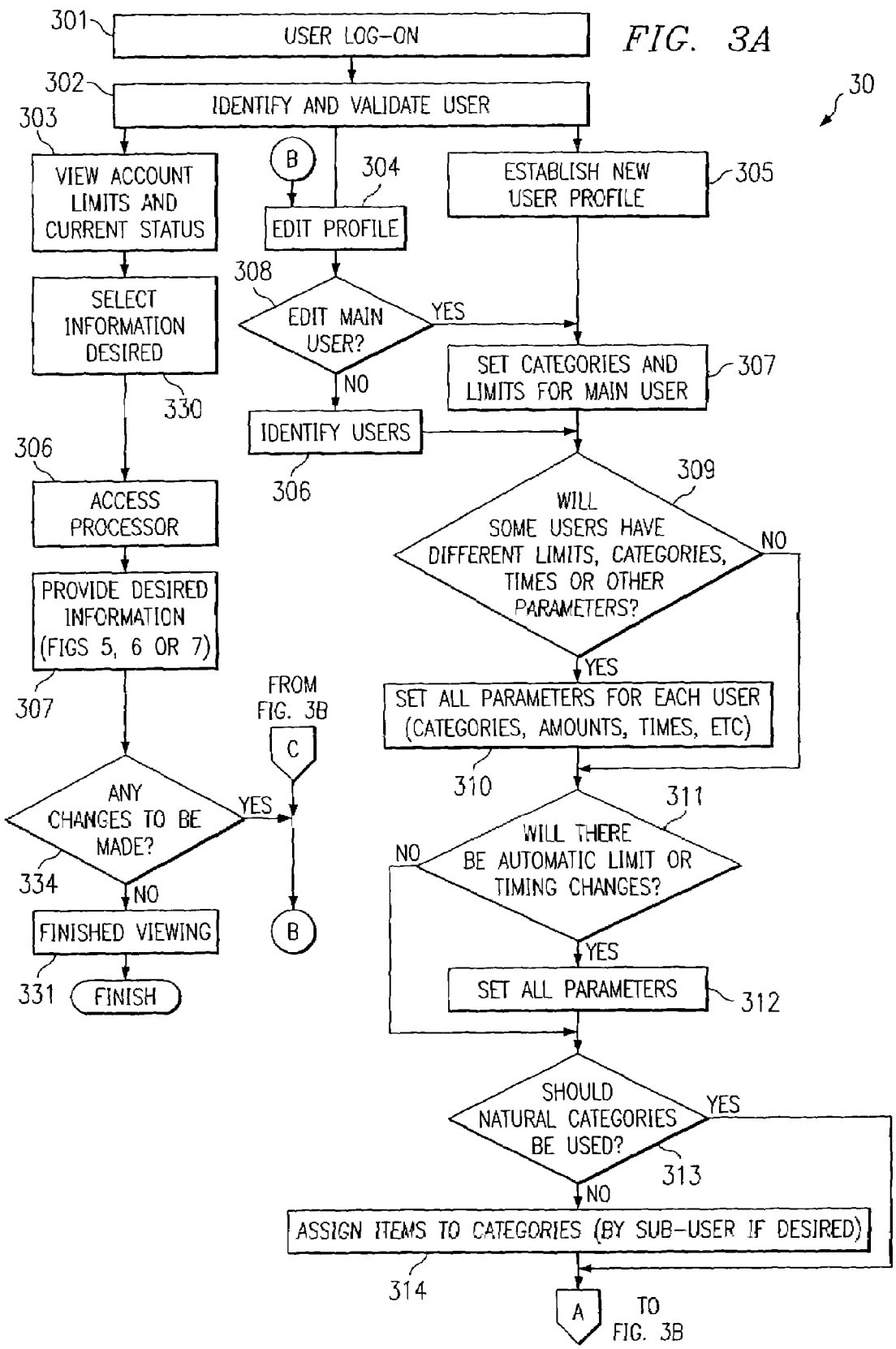

FIG. 3A shows system 30 which is one embodiment of a system utilized to enable system 10 (FIG. 1), or system 20 (FIG. 2) where a user can establish various categories and credit limits and/or view the existing account at any time. In process 301 the user logs onto the system as is well known. In process 302 the user is identified and is validated by the system. At this point the user is given several choices, three of which are shown in FIG. 3A. One such option, as shown in process 303, allows the user to view the account limits and current status. The user in process 304 could edit the profile and in process 305 the user may establish new profiles.

Assuming the user wanted to view the account limits, then the user in process 330 would select the desired information. The system in process 306 would access the processor and other databases and profiles to provide the desired information, via process 307, which could be in the form of FIG. 5, 6 or 7, or other profile information. If the user desired to just view the information, process 334, then when the user was finished, as shown by process 331, the connection would be terminated in a well known manner.

If changes were to be made, as controlled by process 334, then the user would be directed to edit profile process 304, and the user could either edit the main user or sub-users. Assuming the main user is to be edited, the user is directed to the same path as would be utilized if there was to be established a new profile via process 305, such that the user, under control of process 307 would set the categories and limits for the main user.

Going back to process 308, had the main user decided to edit some profile other than the main user's profile, then the users would be identified via process 306 and the paths then would be concurrent for both the sub-users and main user, such that process 309 would inquire as to whether some users would have different limits, categories, times or parameters.

If the answers was yes, then those parameters would be set for each user as to which category, amount, time or any other parameter desired for individual sub-users and the main user. If everybody were to have the same limits, then process 309 would skip to process 311 and the question would be answered as to whether there are automatic limits with timing changes to be applied. If there were, those parameters would be set via process 312. Process 312 would also control any other parameter that needed to be set, such as, by way of example, the user's home address, phone number, email address, auxiliary addresses (both physical and electronic), cell phone numbers. Pagers, PDA addresses, third party notifications, together with their respective contact information, passcodes, special limits.

After the user is finished entering all of the desired parameters, the question would be asked as to whether the normal categories of purchase goods were to be used. By this it is meant that some categories would be preset by the system itself, such that clothes being purchased would always go under the clothing category. However, if desired, a user could decide that clothes from certain stores, or certain types of clothing, such as sporting clothes, would go under a sporting category. The user could decide, for example, such that certain foods would go under a discretionary category other than food. This can be seen in FIG. 6 where the natural category for, say ice cream, would be food, but a user could switch the natural category to a profile category of snack, if desired. Likewise, fishing gear would have a normal category of sporting goods, whereas this user would have a profile category of boating. This would allow a user to more finely tailor his or her profile to be more accommodating of the user's needs. It would allow a fine tuning of budgeting and expenses on an 'as you go' basis.

In process 314, the user can assign items to categories and can do so by sub-user if desired, so that certain sub-users can have access to all categories, or some categories, and also what items are included in those subcategories. For example, a parent may allow a child a credit card for the purchase of food, and restrict the child from buying alcohol or cigarettes, if so desired. Or, the parent could allow the child to have a credit card for the purchase of gasoline for the family car, but other products sold at the service station would fall into a different category, either naturally or as a selection under the categories selected under process 314, such that only certain products such as gasoline could be purchased by certain users of the credit card.

Continuing on FIG. 3B, if the user desired to set priorities for different categories, process 315, such that as discussed above, based upon the priority level set in process 316, and the trigger amounts in 318, the user would be notified of different category levels such that the user is better able to maintain a strict budget when necessary. Since these limits are all self-imposed the user can determine, on a category by category basis, the difficulty and manner for overriding any "inhibiting" message.

In process 317 it is determined whether only the point of sale user is to be notified, and if so, how that notification is to be made via process 319. Notification can be printed on the receipt, or the notification can be by cellular phone call, email or other notification and can be contemporaneously with the transaction or thereafter. If third parties are to be notified, then the names of the third parties and mode of notification can be set via process 321, all of which would be stored in database 16 and profile 17 (FIG. 1) via process 320.

Before exiting the system, the user may wish to edit the profiles, perhaps to add other people or other categories, limits or the like. If so the system recycles back to process 304, FIG. 3A. If not, the user is finished with the profile.

Turning now to FIG. 4, there is shown system 40 which illustrates one embodiment of the point of sale transaction where the user is in the process of buying a product using a credit facility. The user typically would have a card swiped through a reader, as discussed in FIG. 1. This operation is shown by processes 401 and 402. System 40 would then determine via process 403 whether the user has a profile. If not, the system would proceed as normal, in the well known manner.

If the user has a profile, then the profile is accessed via process 404 and the profile then begins to control the transaction at the point of sale. If there is not a message is to be sent to the user, or to a third party, and if no other special action is to be taken, then the system would proceed normally. If special POS actions are required, then the system would obtain any appropriate information from the point of sale via process 406. This information can be information from the specific transaction, such as items purchased, categories, amounts of each item. Or it could be information pertaining to the user, such as for example, a picture of the user, iris scan, fingerprint, or other biometric. In this case the picture (or other information) of the user would become an item to be stored and perhaps sent to third parties for verification of the transaction, or simply for record purposes. The information from the POS could be a user response, such as, for example, the mileage on a car. This information could then be used by the system to calculate the user's gas mileage (miles per gallon) based on "Gas" category purchases and user supplied information.

If necessary, process 407 would utilize POS information, such as bar codes or other category information, to then obtain other data from a data base. For example, based upon a bar code obtained from the POS, information could be sent back to the user at the POS or could be forwarded to one or more third parties, perhaps for verification, or for registration, or the like. Pictures of the purchased items could be obtained, along with specifications, warranty information, last minute updated information (such as usually contained in a Read Me file) and sent to the customer at the point of sale, if desired. If a message is to be sent to a third party via process 408, then this message is either sent or posted via process 409. Another example, would be for the system, based on profiled information, to send third party and address information back to the user, perhaps so that the user can send a purchase to the third party.

If the system must wait for verification from a third party, as contained in process 410, then process 420 controls this waiting period and the POS transaction stops until the desired information is returned. This information could be approval or other information from third parties, or it could be service contract information, specification information, or other types of information desired by a customer.

Then it is determined if a message is to be sent to the user. This message could be the overall account balance, or a category account balance, or if desired a summary of category balances. This information can be delivered before the completion of the transaction, or afterward, and it could be contained on a receipt generated at the POS or it could be a communication to a third party, all determined by the profile of the user.

Process 412 controls as to whether the transaction is to be inhibited in any manner. If it is, inhibiting (or blocking if desired) is controlled by processes 416 and 417. If it is not to be inhibited, a determination must be made if a message is to be sent to the user at the point of sale, or other places as controlled by processes 413, 414, 415, 418 and 419. If the transaction is to be inhibited, this is controlled by processes 416 and 417, all under pre-control of the user.

FIG. 5, as discussed above, shows different categories, codes for categories, amounts that the user has decided upon, the priority of the category, the accounting period for the priority, and how much the category can be adjusted and when the adjustment would occur.

For example, in the food category, the amount is $200.00 per week, but during the months of July and August, this is adjusted by $100.00 to take into account the different food intake needs of the family during vacation periods. In this case, all users have access. Code 4, which is restaurants, is a monthly account of $200.00 for eating out at restaurants. It is adjusted by $300.00 during the month of July, and the only user that can use it is the A user. The boat account is $1,000.00. It is a semi-annual amount and has a priority 3, which if desired, means that if other categories are over at a particular time when the boat account is to be used this account will be inhibited (subject to being overridden by the user) until the overall account balance goes below a certain amount.

As shown in the example, only the B user can buy purchases in the boat account. For this user account alcohol is a code inhibited for all users. Thus this account, regardless of who the user is, cannot buy alcohol because of the self-imposed prohibition. Of course, such prohibitions could apply to any category, such as tobacco, movies, etc., as established by the user of the account. These prohibitions can be on a category by category basis and can be more finely granulated so that sub-user accounts can each have different permission levels if desired.

FIG. 6 shows different natural categories that have been changed to the profile categories, depending upon the specific needs of this user. Thus, when the system processes purchases in certain natural categories, these categories are "translated" into the categories that the user desires. Thus, as discussed above, instead of ice cream being classified as a food, for this user, ice cream would be accounted of in the category called snacks.

FIG. 7 shows a sample printout of information that is available to the user on demand of the user. This information can be periodically delivered to the user, or the user can obtain the information on-line via, for example, the Internet. The available information shows usage by category according to the specific profile of the user. This then allows the user to plan purchases and to know at any time where the user is with respect to the user's own budget. Of course, FIG. 7 can be arranged in any way and the information can be provided in different formats, and it even could be arranged as the user would like it to be, based upon user-designed formats.

It should be noted that while the example discussed above is an example using a credit card, the term credit facilitation system can be a credit card, a debit card, a smart card or even a card issued by a specific store, chain or organization for the purpose of providing discounts and/or identity for particular users.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same results as the corresponding embodiments described herein may be utilized according to the present invention. Accordingly, the appended claims are intended to include within their scope such processes, machines, manufacture, compositions of matter, means, methods, or steps.

What is claimed is:

1. The method for processing financial transactions from users identified at points of sale, said method comprising the steps of:
   storing a profile for certain of said users, said profile keyed to said user's identity, said profile containing a set of categories, each category containing a user set amount of spending; and
   sending a message to one of said users for a current financial transaction, said message including a balance of financial transactions in a particular category, said message being sent without request by said user and without regard to said user set amount in said category being achieved, and wherein said message is sent contemporaneously with said current financial transaction.

2. The invention set forth in claim 1 wherein said message is sent to said user at said point of sale.

3. The invention set forth in claim 1 wherein said message is further triggered by said user making a financial transaction in said particular category, and wherein said particular category is the category pertaining to said current financial transaction.

4. The invention set forth in claim 1 wherein said user is a person other than a user identified at a point of sale.

5. The invention set forth in claim 1 wherein said message includes nonfinancial data from a remote database, the nature of said nonfinancial data determined by details of said current financial transaction as obtained from the point of sale of said current financial transaction.

6. The invention set forth in claim 1 wherein said profile includes valid times of use, said valid times automatically changing based on criteria preset by said user.

7. The invention set forth in claim 6 wherein said profile includes a plurality of users and wherein said valid times of use are on a user by user basis for each said profile.

8. The invention set forth in claim 1 wherein said profile includes a plurality of third parties and wherein said message operates to allow a user at a point of sale to direct a message to a selected third party as contained in said profile.

9. The invention set forth in claim 1 further comprising:
   sending a message to said point of sale, said message containing information pertaining to the identity of said identified user, said last-mentioned message based upon a stored profile of said user.

10. The invention set forth in claim 9 wherein said information sent to said point of sale is selected from the list of: picture, sound, video, or biometric.

11. The invention set forth in claim 1 further comprising:
   accepting data from said user for delivery to a database.

12. The invention set forth in claim 11 wherein said accepted data is a change in said user set amount of spending in a particular category.

13. The invention set forth in claim 11 wherein said accepted data pertains to a specific financial transaction.

14. The invention set forth in claim 1 further comprising:
   accepting from said user a rearrangement of user set amounts between at least two categories.

15. The invention set forth in claim 1 further comprising:
   blocking specific items within a category for a particular user of said category.

16. The invention set forth in claim 3 wherein said user can shift specific items from a natural category to a user selected category.

17. The invention set forth in claim 1 wherein at least some of said categories have sub-users and wherein said balance is a balance of financial transactions that includes all sub-users in said particular category.

18. The method for processing financial transactions from users identified at points of sale, said method comprising the steps of:
   storing a profile for certain of said users, said profile keyed to said user's identity, said profile containing a set of categories, each category containing a user set amount of spending, and
   sending a message to one of said users for a current financial transaction, said message including a balance of financial transactions in a particular category, said message being sent without regard to said user set amount in said category being achieved, said message being triggered by said user making a financial transaction in said particular category, wherein said particular category is the category pertaining to said current financial transaction, and wherein said message contains said user set amount for said particular category.

* * * * *